(12) United States Patent
Witty et al.

(10) Patent No.: US 10,012,548 B2
(45) Date of Patent: Jul. 3, 2018

(54) PASSIVE INFRARED SENSOR SELF TEST WITH KNOWN HEAT SOURCE

(71) Applicant: Google Inc., Mountain View, CA (US)

(72) Inventors: Evan Witty, San Francisco, CA (US); Andrew Dai, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/933,088

(22) Filed: Nov. 5, 2015

(65) Prior Publication Data

US 2017/0131149 A1   May 11, 2017

(51) Int. Cl.
| | |
|---|---|
| G01D 18/00 | (2006.01) |
| G01J 5/52 | (2006.01) |
| G01J 5/34 | (2006.01) |
| G01J 5/08 | (2006.01) |
| G01J 5/02 | (2006.01) |
| G01J 5/00 | (2006.01) |

(52) U.S. Cl.
CPC ............... *G01J 5/522* (2013.01); *G01J 5/026* (2013.01); *G01J 5/0896* (2013.01); *G01J 5/34* (2013.01); *G01J 2005/0048* (2013.01)

(58) Field of Classification Search
CPC . H04N 5/33; G01J 5/522; A61B 6/583; G01T 1/40; G01D 18/00
See application file for complete search history.

(56) References Cited

U.S. PATENT DOCUMENTS

| | | | | |
|---|---|---|---|---|
| 4,749,871 A | * | 6/1988 | Galvin | G08B 17/103 250/573 |
| 4,752,768 A | * | 6/1988 | Steers | G08B 13/19 250/221 |
| 4,912,748 A | * | 3/1990 | Horii | G07C 9/00 250/221 |
| 5,499,016 A | * | 3/1996 | Pantus | G08B 29/046 250/222.1 |
| 5,880,954 A | * | 3/1999 | Thomson | G05B 9/02 250/221 |
| 6,072,150 A | | 6/2000 | Sheffer | |

(Continued)

FOREIGN PATENT DOCUMENTS

| | | |
|---|---|---|
| CN | 2875902 Y | 3/2007 |
| CN | 100387948 C | 5/2008 |
| WO | 2007123755 A2 | 11/2007 |

OTHER PUBLICATIONS

Adams, "Near Field Infrared Background Noise Simulation", No. MC-61-5-R5. Mithras Cambridge MA, 1965.

*Primary Examiner* — David Porta
*Assistant Examiner* — Mamadou Faye
(74) *Attorney, Agent, or Firm* — Morris & Kamlay LLP

(57) ABSTRACT

A passive infrared sensor having a radiation capture component may be housed within a sensor device. The device may also house radiation emission components, such as light emitting diodes, in proximity to the capture component. Electronic circuitry within the device may generate a signal that causes the emission components to emit radiation that includes wavelengths in the infrared spectrum. The infrared radiation may be captured at the capture component. Characteristics of a signal generated by the capture component may be compared to test characteristics. Based on this comparison, it may be determined that the passive infrared sensor is not operating properly.

20 Claims, 11 Drawing Sheets

(56) References Cited

U.S. PATENT DOCUMENTS

| | | | |
|---|---|---|---|
| 7,639,115 B2* | 12/2009 | Valoteau | G08C 19/28 340/12.23 |
| 2005/0205773 A1 | 9/2005 | Fauci et al. | |
| 2007/0018106 A1* | 1/2007 | Zhevelev | G01J 5/08 250/353 |
| 2008/0144885 A1* | 6/2008 | Zucherman | G06K 9/3241 382/103 |
| 2009/0026355 A1* | 1/2009 | Anderson | G08B 13/08 250/221 |
| 2009/0167862 A1* | 7/2009 | Jentoft | G08B 13/19641 348/143 |
| 2012/0312976 A1 | 12/2012 | Boulanger et al. | |
| 2013/0300198 A1* | 11/2013 | Yamashina | H02J 9/005 307/39 |
| 2014/0160299 A1 | 6/2014 | Mumaw et al. | |
| 2016/0240057 A1* | 8/2016 | Galburt | G08B 7/06 |

* cited by examiner

US 10,012,548 B2

PASSIVE INFRARED SENSOR SELF TEST WITH KNOWN HEAT SOURCE

BACKGROUND

Passive infrared sensors generally contain delicate wire bonds and connecting components that are easily broken. The output from a broken passive infrared sensor configured to detect human motion is often indistinguishable from the output of a functioning passive infrared sensor when no human motion is present. Conventional self testing techniques for passive infrared sensors measure sensor operation indirectly. For example, conventional techniques apply a charge to one of two terminal pins connecting the electronic circuitry of the sensor device to pyroelectric material. The voltage drop between the terminal pins is measured, and if the voltage drop differs from a tolerance value, the sensor is determined to be operating improperly. A significant drawback of such techniques is that they only evaluate the drive circuitry or amplification circuitry of the sensor device. Other critical sensor components, such as the pyroelectric material are not evaluated. Thus in some circumstances, conventional techniques will not detect certain defects in passive infrared sensors.

BRIEF SUMMARY

According to an implementation of the disclosure, a device may emit radiation from an emission component housed in the device and capture infrared radiation at a capture component housed in the device. A characteristic of the infrared radiation may be compared to a test characteristic, and it may be determined that the capture component is not operating properly when the characteristic of the infrared radiation differs from the test characteristic by greater than a threshold quantity.

According to another implementation of the disclosure, a device may include a radiation emission component and a radiation capture component. The device may be in communication with a processor configured to execute instructions. The instructions when executed may cause the emitting of radiation from the emission component, capturing of infrared radiation at the capture component, and comparing of a characteristic of the infrared radiation to a test characteristic. The instructions when executed may determine that the capture component is not operating properly when the characteristic of the infrared radiation differs from the test characteristic by greater than a threshold quantity, and determine a status of the device based on determining the capture component is not operating properly.

According to another implementation of the disclosure, a non-transitory computer readable medium may store instructions that, when executed, detect that a device is not properly mounted. The instructions when executed, may, in response to detecting the device is not properly mounted, cause the emission of radiation from an emission component housed in the device, capture of infrared radiation at a capture component housed in the device, and comparison of a characteristic of the infrared radiation to a test characteristic. The instructions when executed may determine that the capture component is not operating properly when the characteristic of the infrared radiation differs from the test characteristic by greater than a threshold quantity.

Another implementation of the disclosure may include a means for emitting radiation from an emission component housed in a device and capture infrared radiation at a capture component housed in the device. An implementation may also include means for comparing a characteristic of the infrared radiation to a test characteristic and determining that the capture component is not operating properly when the characteristic of the infrared radiation differs from the test characteristic by greater than a threshold quantity.

Additional features, advantages, and embodiments of the disclosed subject matter may be apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide further understanding of the disclosed subject matter, are incorporated in and constitute a part of this specification. The drawings also illustrate implementations of the disclosed subject matter, and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

To address the issues previously described, devices, systems, and techniques as disclosed herein may provide for the self testing of a passive infrared (PIR) sensor using a known heat source emitted from an emission component housed in the same device as the PIR sensor. For example a PIR sensor having a radiation capture component, may be housed within a sensor device. The device may also house radiation emission components, such as light emitting diodes (LEDs), in proximity to the capture component of the PIR sensor. Electronic circuitry within the device may generate a signal that causes the LEDs to emit radiation that includes wavelengths in the infrared spectrum. It may be known that under normal operation the emitted radiation is captured by the capture component of the PIR sensor, and when captured, the PIR sensor generates an output signal having characteristic features, such as a characteristic voltage peak. These known characteristics may be used as test characteristics, such as a test voltage. The characteristics of the output signal generated by the PIR sensor, if any, may be compared to the test characteristics. If the output characteristics differ from the test characteristics by more than a threshold amount, such as the output voltage being less than the test voltage by more than 10%, then a status may be generated that indicates the PIR sensor is not operating properly.

Implementations of the disclosure may be partially or completely incorporated within home automation systems such as the "smart home environment" described in later portions of this disclosure.

Figure 1:
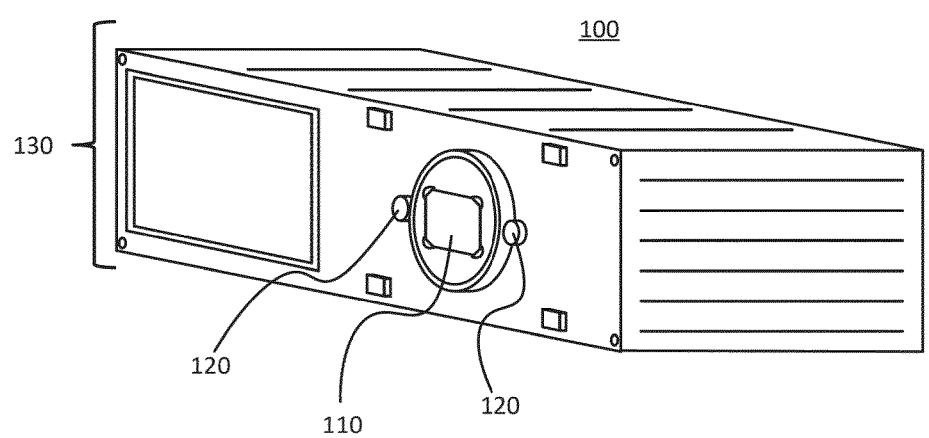
FIG. 1 shows a sensor device housing a radiation capture component and radiation emission components according to an implementation of the disclosure.

A sensor device may include a PIR sensor and radiation emission components. The PIR sensor may include radiation capture components as well as electronic circuitry for the operation and control of the radiation capture components. The sensor device may include electronic circuitry for operation and control of the sensor device as well as interfacing with other components of a home automation system. For example, FIG. 1 shows a sensor device 100 that includes a radiation capture component 110, one or more radiation emission components 120, and a housing 130, according to an implementation of the disclosure. The sensor device may be a stand-alone device or coupled to a network in communication with components of a home automation system, such as a sensor, or a home monitoring hub. The device may include additional components sufficient to operate and control the radiation emission and capture components and communicate with other components of a home automation system. For example, the device may include memory, processors, electronic circuitry, and wireless communication components, such as those described with respect to FIGS. 10A-10B, FIG. 11, and FIG. 12 below.

Radiation capture component 110 may include pyroelectric materials such as gallium nitride, caesium nitrate, polyvinyl fluorides, derivatives of phenylpyridine, cobalt phthalocyanine, other similar materials commonly used in PIR sensors, or any other material that generates energy when exposed to heat and that is suitable for the purposes of the disclosure. The energy generating materials may be formed in a thin film and positioned parallel with the sensor face of the device or in other formations or locations suitable to capture infrared radiation from emission components. A single radiation capture component or multiple radiation capture components may be employed in implementations of the disclosure.

Radiation emission components 120 may include infrared LEDs, however the type of emission component may be any type of component that emits electromagnetic radiation that includes radiation in the infrared or near infrared spectrum. For example the emission component may be an LED point source, a laser, or a lens-focused light source such as an incandescent lamp or an organic LED. In certain embodiments non-point sources may also be employed. A single radiation emission component or multiple radiation emission components may be employed in implementations of this disclosure. Any suitable electromagnetic radiation may be emitted from an emission component, including infrared radiation, near-infrared radiation, non-visible light containing infrared or near-infrared radiation, or white or other visible light containing infrared or near-infrared radiation.

The radiation emission components may by arranged adjacent to the radiation capture component as shown. Other dispositions of the emission components over or within the housing 130 of the sensor device are also contemplated, such that at least one emission component may emit radiation that may be captured by the radiation capture component. In implementations of the disclosure, the radiation capture component may also be at a location physically distinct from the radiation emission components. For example, a radiation emission component may be located on one side of a room and a radiation capture component may be located on the opposite side of the room. The two components may be in communication with one another as well as other components of the smart home environment and configured to execute any of the processes set forth in this disclosure. For example the two components may also be physically distinct from and in communication with a computing device that may store and execute instructions for the operation and control of each component as well as other components of the smart home environment.

Figure 2:
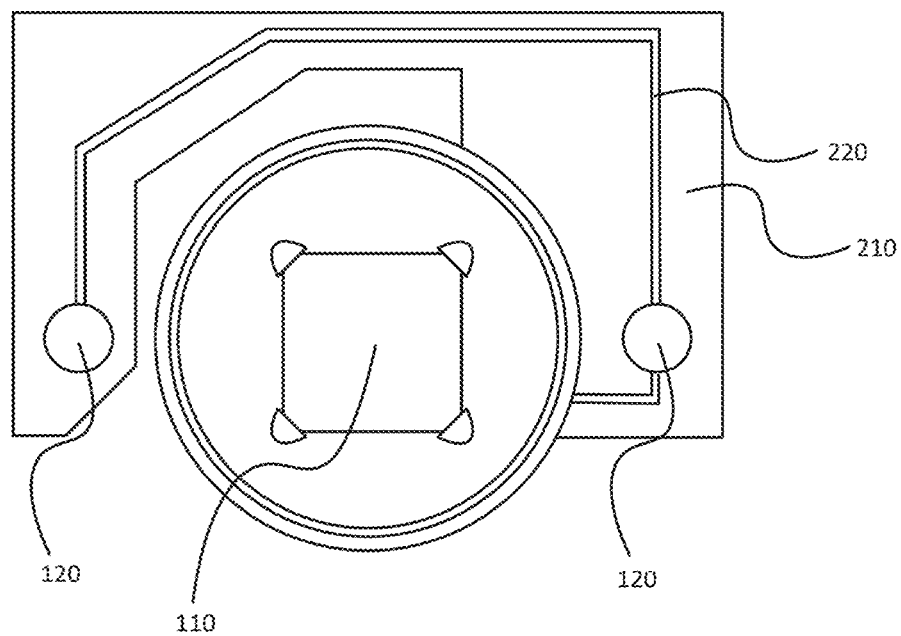
FIG. 2 shows a radiation capture component, a radiation emission component, and electronic circuitry according to an implementation of the disclosure.

Electronic circuitry may operate and control radiation emission and radiation capture components housed in sensor device 100. For example, FIG. 2 shows a two dimensional view of capture component 110, emission components 120, and electronic circuitry 210 operatively connected by electronic connection 220, according to an implementation of the disclosure. Operation and control of the PIR sensor and sensor device may take place locally, remotely, or across both local circuitry and remote electronic circuitry, network components, and computing devices. For example, computer implemented instructions may be executed in a home monitoring hub and communicated wirelessly to communications components housed in the sensor device. These instructions may cause the PIR sensor and emission components to execute self testing processes, such as those discloses herein.

Figure 3:
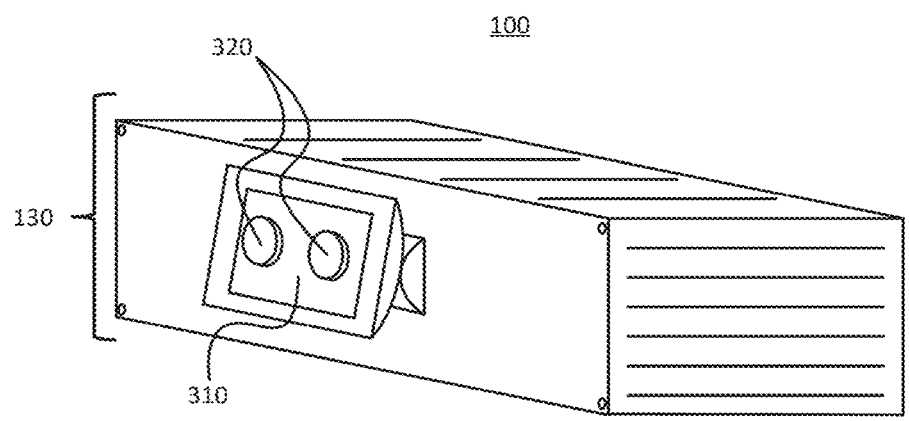
FIG. 3 shows a sensor device housing an attachment component and an attachment sensor according to an implementation of the disclosure.

PIR sensors may be damaged in a variety of ways. For example, a home intruder may strike the sensor device housing a PIR sensor, or the sensor device may be inadvertently struck and dislodged from an elevated mounting and fall to the floor when moving furniture. Implementations of the disclosure may detect when a PIR sensor has undergone a potentially damaging event via an attachment sensor. For example, FIG. 3 depicts the mounting face of sensor device 100. The housing 130 may include attachment component 310 and attachment sensor 320. The attachment component may be any component suitable for the purposes of the disclosure. For example, the attachment component may be a component that physically attaches the sensor device 100 to a surface or fixture of a premises, as well as to movable or fixed components of the smart home environment, such as furniture, a sensor assembly, or a mobile home automation robot. The attachment component may be flexible or rigid, or removable or fixed, such as a latch, hook, clasp, clamp, bracket, bolt, flexible mounting arm, and so forth.

The attachment sensor 320 may be any sensor suitable for the purposes of the disclosure that may detect when the sensor device 100 is not properly mounted. For example, the attachment sensor may be a mechanical tamper switch that provides or restricts transmission of an electrical signal when the mechanical tamper switch has been triggered, an electrical tamper switch comprising a first electrode housed in an attachment component of the sensor device and a second electrode disposed on a surface to which the device is mounted, a magnetic switch, or a light sensor.

The attachment sensor may provide a characteristic signal to other components of the sensor device or components of the greater smart home environment when the sensor device is properly mounted or not properly mounted. For example, when the mechanical switch is in the mounted position, both electrodes of the electrical switch are connected, or a certain magnetic field is detected by the magnetic switch, a particular signal may be provided to other components. When the sensing device is dislodged, the particular signal may change or disappear. Similarly, when the accelerometer detects acceleration over a threshold value or the light sensor detects a quantity light when proper mounting of the sensing device normally prevents such light, a particular signal may be provided that may indicate the sensor device is not properly mounted. Thus based on the attachment sensor, the sensor device or other components of the smart home environment may detect when the sensor device is not properly mounted.

Figure 4:
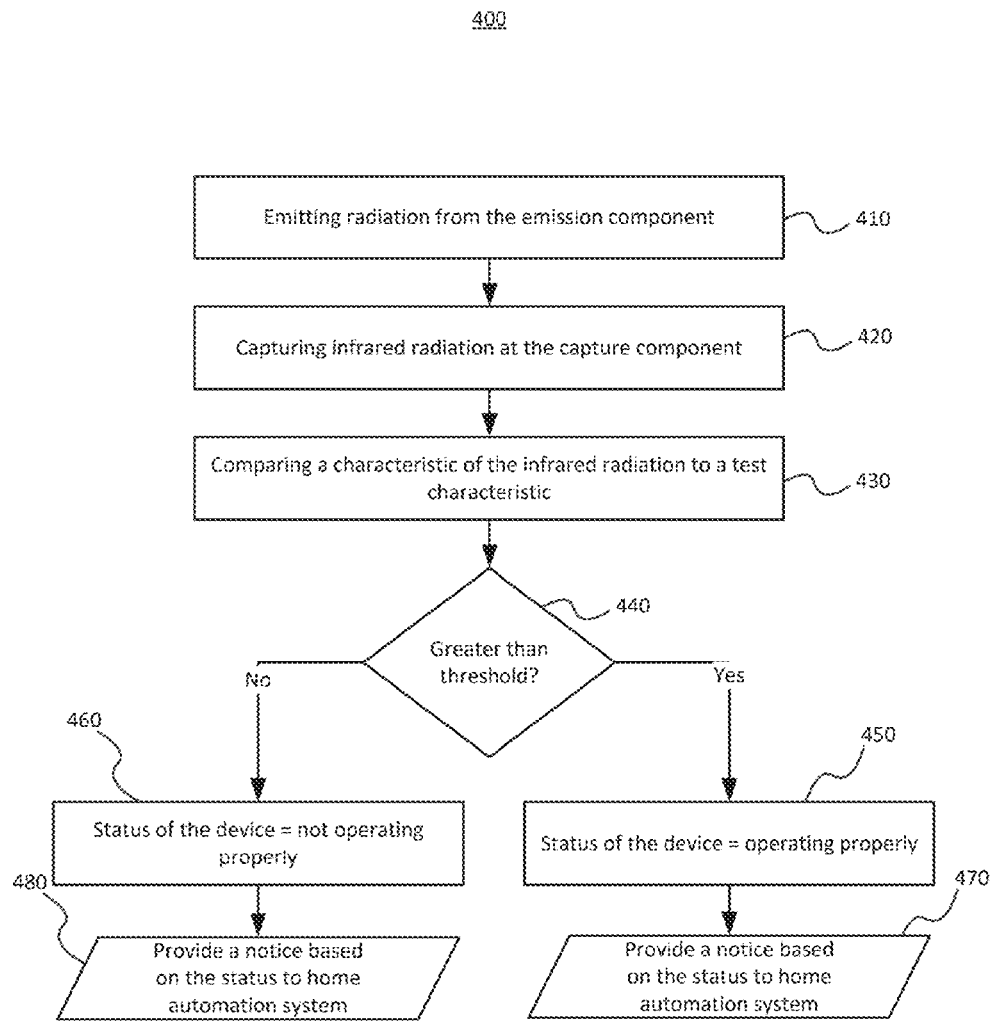
FIG. 4 shows a method for self testing a passive infrared sensor using a known heat source according to an implementation of the disclosure.

In response to detecting the sensor device is not properly mounted, the PIR sensor may be tested to determine whether it is functioning properly. For example, FIG. 4 shows a method 400 for self testing a passive infrared sensor using a known heat source according to an implementation of the disclosure. At 410 the device may emit radiation from an emission component housed in the device. The emission component may emit radiation in range of wavelengths that includes infrared radiation. For example, the emission component may be a LED that emits wavelengths in the visible, infrared, and near infrared spectrum. In general, when the emission component emits radiation it may also be emitting infrared and/or near infrared radiation.

Radiation emitted from the emission component may have a variety of characteristics. In general, the emitted radiation may contain radiation in infrared wavelengths having energy greater than the infrared background sources in the environment surrounding the sensor device. This may be advantageous in distinguishing radiation emitted from the emission component from general background radiation in the environment. The emitted infrared radiation may have a predetermined energy value. For example, the emitted infrared radiation may have an energy that is less than energy of infrared radiation generated by an average human in the field of view of the PIR sensor at a distance of approximately 6 meters. This energy level may be advantageous to ensure the PIR sensor is capable of sensing the motion of humans within a practical distance. Likewise, the emitted radiation may also include radiation having wavelengths between 8-14 microns. This range may be advantageous because it includes wavelengths commonly generated by humans without external illumination.

It may have previously been determined that when the emission component emits radiation, a radiation capture component housed in the device captures radiation having particular characteristics. These particular characteristics of the captured radiation may be attributed to the emitted radiation and certain particular characteristics may be deemed test characteristics. For example, a test characteristic may include the characteristic that when the emitted radiation is captured at the capture component, a particular voltage is generated at the capture component. For example the capture component may include a pyroelectric material having a crystal structure that polarizes and generates a particular electric potential in response to the incident emitted radiation. The particular electric potential may be deemed a test voltage and may have a value, for example, of +0.20 mV.

Figure 5:
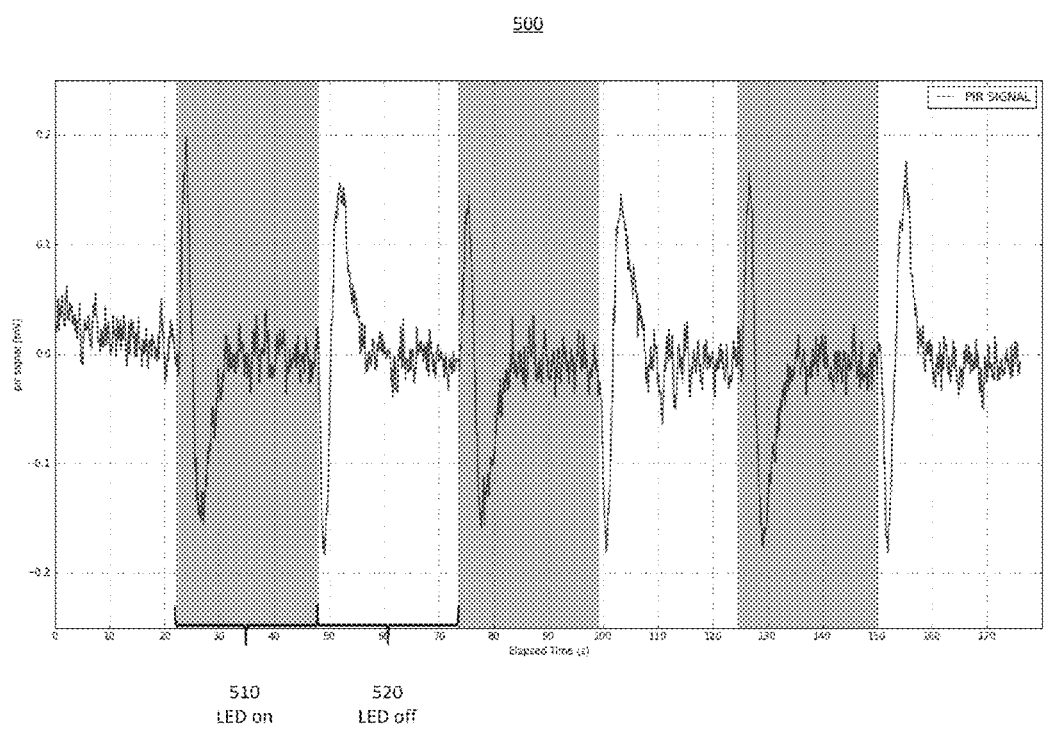
FIG. 5 shows a signal sequence of a known heat source according to an implementation the disclosure.

In another example, a test characteristics may include the characteristic that when the emitted radiation is captured at the capture component, a particular sequence of voltages over a particular period of time is generated at the capture component. This particular sequence may be deemed a test sequence. FIG. 5 shows a signal sequence of a known heat source according to an implementation the disclosure. As shown, signal sequence 500 shows a first sequence when a LED emission component is emitting and a second sequence 510 when the LED emission component is not emitting 520. Thus a test characteristic of the emitted radiation may include a test sequence that includes a first voltage peak at approximately +0.20 mV followed by a second voltage peak at approximately −0.16 mV, both within the 10 seconds after emission of the emitted sequence. Test characteristics may include other characteristics of radiation, such as wavelength, frequency, energy, intensity, and so forth.

At 420 the sensor device may capture infrared radiation at the capture component. The captured infrared radiation may be all or a portion of the emitted radiation. At 430 a characteristic of captured infrared radiation may be compared to a test characteristic. For example, if the characteristic of the captured radiation is a detected voltage, then the difference between the detected voltage and a test voltage may be computed. In another example, if the characteristic of the captured radiation is a detected sequence of voltage peaks, then the difference between the magnitude, sign, and frequency of the detected voltage peaks may be compared to the magnitude, sign, and frequency of voltage peaks in a test sequence.

At 440 if the difference between the captured characteristic and the test characteristic is greater than a threshold quantity, then it may be determined that the PIR sensor is not operating properly. The difference may be based on the absolute value of a calculation. For example, the threshold quantity may be 0.05, the detected voltage may be 0.07 mV, and the test voltage may be 0.15 mV. In this example the difference between the captured characteristic and the test characteristic may be computed to be:

$$|(0.07\ mV)-(0.15\ mV)|=|-0.08\ mV|=0.08$$

$$0.08>0.05$$

Thus, in this example, it may be determined that the PIR sensor is not operating properly.

In another example, the threshold quantities may be +0.05, +0.05, and +0.03. In this example, the test characteristic may be a test sequence of a first peak at +0.15 mV, a second peak at −0.10 mV, and a frequency of 0.20 peaks per second. The detected sequence may have a first peak at +0.19 mV, a second peak at −0.07 mV, and a frequency of 0.22 peaks per second. In this example, the difference between the captured characteristic and the test characteristic may be computed to be:

$$|(+0.19\ mV)-(+0.15\ mV)|=|+0.04\ mV|=0.04$$

$$|(-0.07\ mV)-(-0.10\ mV)|=|+0.03\ mV|=0.03$$

$$0.03<0.05$$

$$0.22-0.20=0.02$$

$$0.02<0.03$$

Thus, in this example it may be determined that the PIR sensor is operating properly.

The status of the PIR sensor may be determined based on the calculations at 440. For example, at 450 if the difference in the captured characteristic and the test characteristic is less than a threshold quantity, then the status of the PIR sensor may be determined to be "operating properly." At 460 if the difference in the captured characteristic and the test characteristic is greater than the threshold quantity, then the status of the PIR sensor may be determined to be "not operating properly."

The status of related components may be similarly determined. For example, if the difference between the captured characteristic and the test characteristic is greater than a threshold quantity, then in addition to or instead of the status of the PIR sensor being determined to be "not operating properly," the particular capture component and/or the entire sensor device may be determined to be not operating properly. The self test procedures disclosed herein may be performed periodically, such as in accordance with a configuration of sensor device housing the PIR sensor. The self test process may be performed automatically and/or may be initiated manually by a user or administrator.

The sensor device may provide a notice based on the status of the radiation capture component, PIR sensor, or sensor device. For example, a notice may indicate whether the PIR sensor is operating properly or not operating properly. A notice may be provided on the sensor device itself, such as by indicating the notice textually or symbolically on a display component of the device, activating an audible alert, or activating a visible alert, such as a sequence of flashes on the emission component. A notice may also be provided to components of the smart home environment. For example, a notice may be provided to: a diagnostic service running on the home monitoring hub, a status profile for the sensor device being maintained on a remote cloud-based home monitoring service, a room profile for the room containing the device, or a device associated with a user, such as mobile phone or tablet owned by an occupant of a home where the sensor device is installed. Thus, at 470 and 480 a notice may be provided to a home automation system based on the status of the device.

Figure 6:
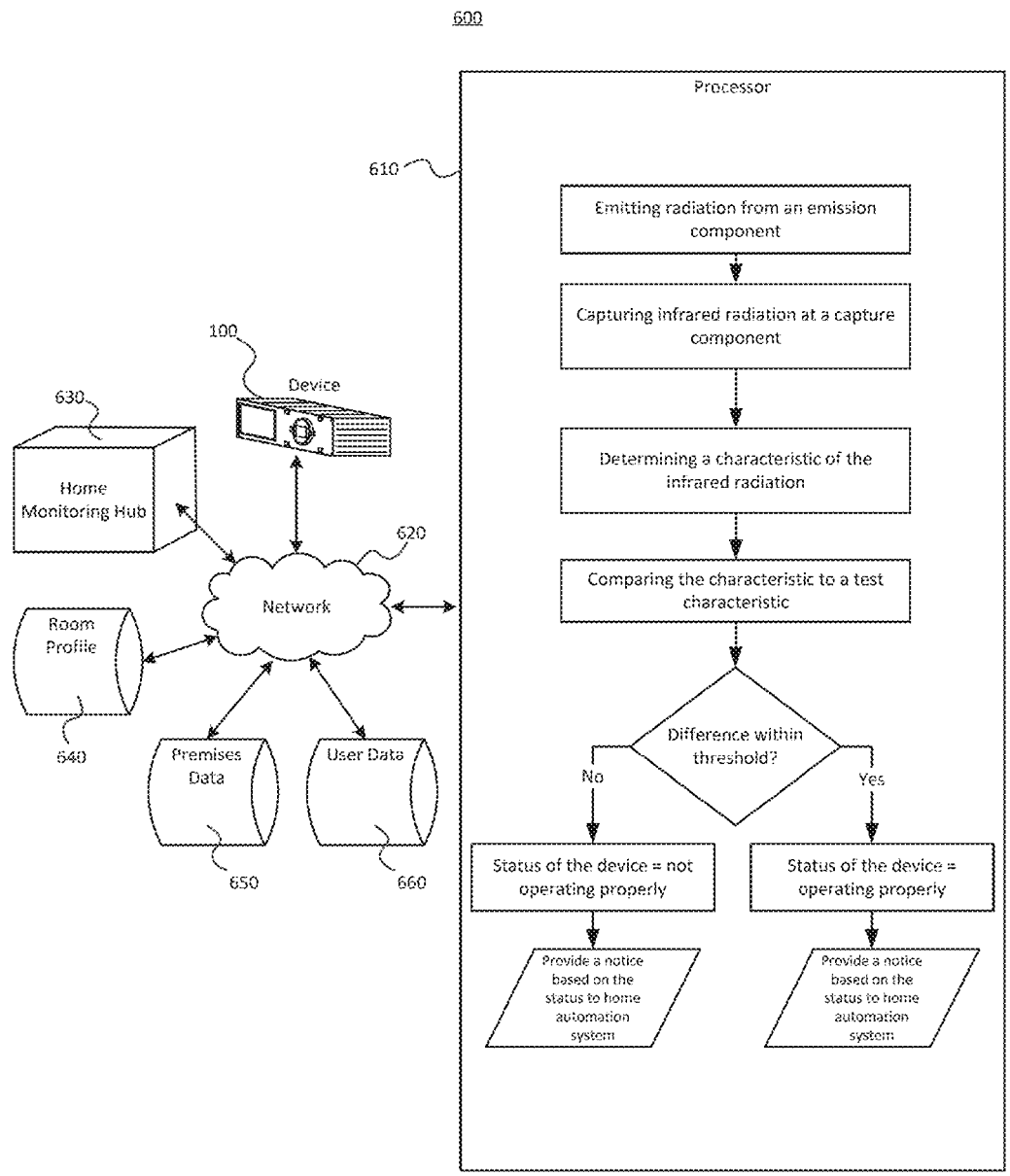
FIG. 6 shows a system for self testing a passive infrared sensor using a known heat source according to an implementation of the disclosure.

Implementations of the disclosed subject matter may be embodied in systems such as that disclosed in FIG. 6. System 600 may include sensor device 100 having a radiation capture component and a radiation emission component, and a processor 610 in communication with the sensor device, for example over network 620. The processor may execute instructions for emitting infrared radiation from the emission component and capturing infrared radiation at the capture component. The instructions when executed may compare a characteristic of the infrared radiation to a test characteristic and determine that the capture component is not operating properly when the characteristic of the infrared radiation differs from the test characteristic by greater than a threshold quantity. The instructions when executed may also determine a status of the device based on determining that the capture component is not operating properly and may provide a notice based on the determined status to a home automation system. Instructions for executing any of the methods or processes disclosed herein, such as those discussed above, may be stored, for example, in a non-transitory computer readable storage medium.

Other components of system 600 may include, for example, home monitoring hub 630, room profile 640, premises data 650, and user data 660, all of which may be stored in database implemented in storage devices or may be embodied in stand-alone devices. These components may be part of a home automation system that may make up or be part of the smart home environment described below. For example, the sensor device described herein may be part of a suite of devices and capabilities integrated into a given room, such as automated lighting systems, automated heating and cooling systems, security systems, and audiovisual systems. Each room may have configurations for these various systems, which may be stored and managed within a room profile for the room. Similarly, each user of a home may have certain user specific configurations for each system of a smart home environment. Premises data may include data from sensors and data sets associated with the home.

In an example, a bedroom in a house may have an imaging sensor on one wall, positioned remotely from a PIR sensor on an opposite wall. The field of view of the imaging sensor may include the PIR sensor. The imaging sensor and a sensor device housing the PIR sensor may be in communication with a home monitoring hub, and a processor of the home monitoring hub may execute instructions for the operation and control of the imaging sensor and PIR sensor. Stored in a storage device in communication with the home monitoring hub may be a room profile for the bedroom that includes configuration settings for the imaging sensor. The configuration settings may indicate that the sensor face of the PIR sensor is within the field of view of the imaging sensor. The imaging sensor may detect movement consistent with a person traversing the field of view of the imaging sensor. A premises data may be updated for the house that indicates detection of the event of a person traversing the field of view of the imaging sensor. A computing device in the home monitoring hub may access the premises data and determine that the event was detected by the imaging sensor, but no event was detected by the PIR sensor. Based on this discrepancy, the home monitoring hub may provide a request to the sensor device housing the PIR sensor to determine the status of the PIR sensor. In response, the sensor device may emit radiation from a radiation emission component in accordance with the self test procedures disclosed herein.

In another example, premises data may indicate that the event of a wireless signal stored in user data, such the wireless ID of an occupant's phone, was detected at the front door of a hallway at a first time. The premises data may also include the event of that the occupant ID was detected at the only other door at the opposite end of the hallway at a second time. A sensor device having a PIR sensor may be located in the hallway, but may not have detected human movement between the first time and the second time. A computing device in the home monitoring hub may determine a period of time elapsed between the first time and the second time. The computing device may also determine that the PIR sensor did not detect an event during this period of time. The home monitoring hub may access a condition that requires the sensor device containing the PIR sensor to execute a self test procedure if it fails to detect an event when the same occupant ID is detected at both doors within a threshold period of time. The threshold period of time may be less than the elapsed period of time. Based on this condition, the home monitoring hub may transmit a request to the sensor device housing the PIR sensor to initiate a self test. The self test may be carried out in accordance with processes disclosed herein, and it may be determined that the status of the sensor device is "not operating properly." A notice indicating the status may then be provided to other components of the smart home environment. For example, the notice may be used to update the room profile, which tracks the operating status of all devices in the hallway, or the notice may be transmitted to the occupant's mobile phone. The home monitoring hub may coordinate these various system as well as provide management of distributed processing and data storage requirements that support the smart home environment.

The methods, systems, and devices set forth in the subject matter of this disclosure may be in communication with other methods, systems, and devices throughout a premises. Combined these systems, methods, and devices may make up the greater smart home environment for the premises. Further aspects of the smart home environment and related components are discussed in the following portions of this disclosure.

In general, a "sensor" as disclosed herein (for example, sensor device 100 of FIG. 1) may include multiple sensors or sub-sensors, such as a position sensor that includes both a global positioning sensor (GPS) as well as a wireless network sensor. This combination may provide data that can be correlated with known wireless networks to obtain location information. Multiple sensors may be arranged in a single physical housing, such as where a single device includes movement, temperature, magnetic, and/or other sensors, as well as the devices discussed in earlier portions of this disclosure. Such a housing also may be referred to as a sensor or a sensor device. For clarity, sensors are described with respect to the particular functions they perform and/or the particular physical hardware used, when such specification is necessary for understanding of the embodiments disclosed herein.

Figure 7A:
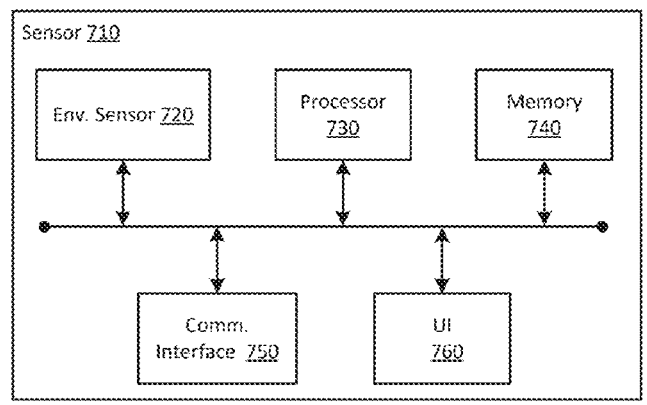
FIG. 7A shows a sensor according to an implementation the disclosure.

A sensor may include hardware in addition to the specific physical sensor that obtains information about the environment. FIG. 7A shows an example sensor as disclosed herein. The sensor 710 may include an environmental sensor 720, such as a temperature sensor, smoke sensor, carbon monoxide sensor, motion sensor, accelerometer, proximity sensor, passive infrared (PIR) sensor, magnetic field sensor, radio frequency (RF) sensor, light sensor, such as any of the devices discussed in earlier portions of this disclosure, humidity sensor, pressure sensor, microphone, or any other suitable environmental sensor, that obtains a corresponding type of information about the environment in which the sensor 710 is located. A processor 730 may receive and analyze data obtained by the sensor 710, control operation of other components of the sensor 710, and process communication between the sensor and other devices. The processor 730 may execute instructions stored on a computer-readable memory 740. The memory 740 or another memory in the sensor 710 may also store environmental data obtained by the sensor 710. A communication interface 750, such as a Wi-Fi or other wireless interface, Ethernet or other local network interface, or the like may allow for communication by the sensor 710 with other devices. A user interface (UI) 760 may provide information and/or receive input from a user of the sensor. The UI 760 may include, for example, a speaker to output an audible alarm when an event is detected by the sensor 710. Alternatively, or in addition, the UI 760 may include a light to be activated when an event is detected by the sensor 710. The user interface may be relatively minimal, such as a liquid crystal display (LCD), LED display, or limited-output display, or it may be a full-featured interface such as a touchscreen. Components within the sensor 710 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Figure 7B:
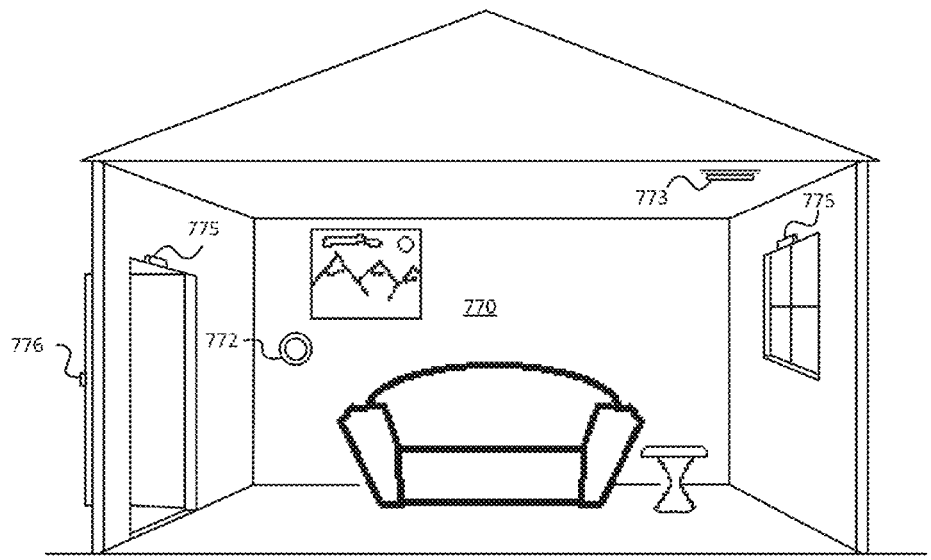
FIG. 7B shows a premises according to an implementation the disclosure.

As an example of the implementation of sensors within a premises FIG. 7B depicts, one or more sensors implemented in a home premises 770 as part of a smart home environment. The smart home environment may include multiple types of home automation devices, such as one or more intelligent, multi-sensing, network-connected thermostats 772, one or more intelligent, multi-sensing, network-connected poisonous gas detection units 773, one or more intelligent, multi-sensing, network-connected entry detection units 775, and one or more network-connected door handles 776.

In some configurations, two or more sensors may generate data that can be used by a processor of a system to generate a response and/or infer a state of the environment. For example, an ambient light sensor in a room may determine that the room is dark (e.g., less than 60 lux). A microphone in the room may detect a sound above a set threshold, such as 60 dB. The system processor may determine, based on the data generated by both sensors, that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary, for example, during the day the room may already be bright or during the night the lights may already be on. As another example, two or more sensors may communicate with one another. Thus, data generated by multiple sensors simultaneously or nearly simultaneously may be used to determine a state of an environment and, based on the determined state, generate a response.

Figure 8A:
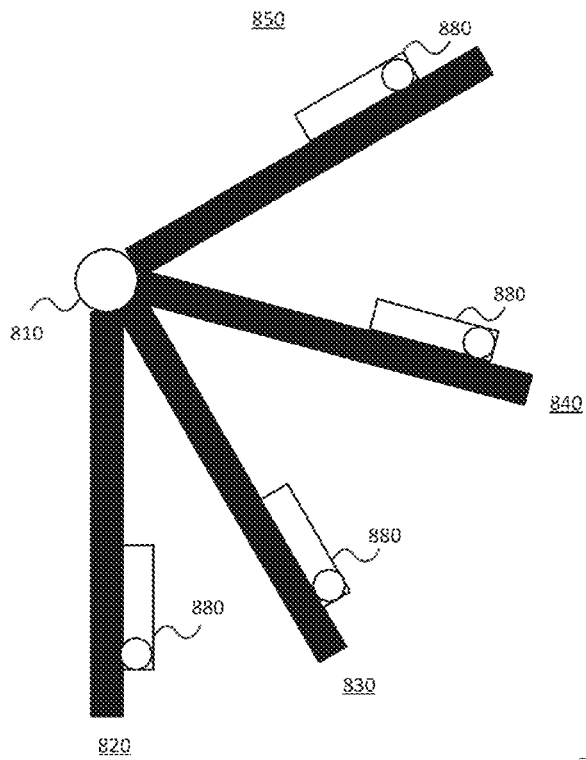
FIG. 8A shows a sensor according to an implementation the disclosure.

As another example, a system may employ a magnetometer affixed to a door jamb and a magnet affixed to the door. When the door is closed, the magnetometer may detect the magnetic field emanating from the magnet. If the door is opened, the increased distance may cause the magnetic field near the magnetometer to be too weak to be detected by the magnetometer. If the system is activated, it may interpret such non-detection as the door being ajar or open. In some configurations, a separate sensor or a sensor integrated into one or more of the magnetometer and/or magnet may be incorporated to provide data regarding the status of the door. For example, an accelerometer and/or a compass may be affixed to the door and indicate the status of the door and/or augment the data provided by the magnetometer. FIG. 8A shows a schematic representation of an example of a door that opens by a hinge mechanism 810. In the first position 820, the door is closed and the compass 880 may indicate a first direction. The door may be opened at a variety of positions as shown 830, 840, and 850. The fourth position 850 may represent the maximum amount the door can be opened. Based on the compass 880 readings, the position of the door may be determined and/or distinguished more specifically than merely open or closed. In the second position 830, for example, the door may not be far enough apart for a person to enter the home. A compass or similar sensor may be used in conjunction with a magnet, such as to more precisely determine a distance from the magnet, or it may be used alone and provide environmental information based on the ambient magnetic field, as with a conventional compass.

Figure 8B:
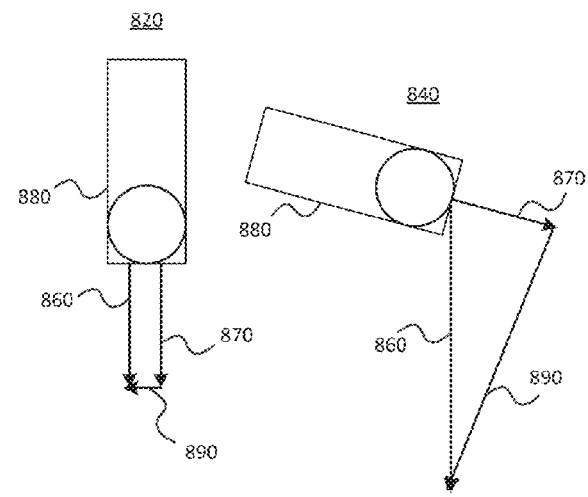
FIG. 8B shows a sensor according to an implementation the disclosure.

FIG. 8B shows a compass 880 in two different positions, 820 and 840, from FIG. 8A. In the first position 820, the compass detects a first direction 860. The compass's direction is indicated as 870 and it may be a known distance from a particular location. For example, when affixed to a door, the compass may automatically determine the distance from the door jamb or a user may input a distance from the door jamb. The distance 860 representing how far away from the door jamb the door is may be computed by a variety of trigonometric formulas. In the first position 820, the door is indicated as not being separate from the door jamb (i.e., closed). Although features 860 and 870 are shown as distinct in FIG. 8B, they may overlap entirely. In the second position 840, the distance 890 between the door jamb and the door may indicate that the door has been opened wide enough that a person may enter. Thus, the sensors may be integrated into a home system, mesh network, or work in combination with other sensors positioned in and/or around an environment.

In some configurations, an accelerometer may be employed to indicate how quickly the door is moving. For example, the door may be lightly moving due to a breeze. This may be contrasted with a rapid movement due to a person swinging the door open. The data generated by the compass, accelerometer, and/or magnetometer may be analyzed and/or provided to a central system such as a controller 930 and/or remote system 940 depicted in FIG. 9A. The data may be analyzed to learn a user behavior, an environment state, and/or as a component of a smart home system. While the above example is described in the context of a door, a person having ordinary skill in the art will appreciate the applicability of the disclosed subject matter to other implementations such as a window, garage door, fireplace doors, vehicle windows/doors, faucet positions (e.g., an outdoor spigot), a gate, seating position, other openings, etc.

The data collected from one or more sensors (for example, sensor device 100 of FIG. 1) may be used to determine the physical status and/or occupancy status of a premises. For example, open/close sensors such as door sensors as described with respect to FIGS. 8A and 8B may be used to determine that an unknown person has entered the premises. The system may first determine that a person has entered the premises due to sensors detecting a door opening and closing in a time span previously determined to be consistent with a person entering or leaving the premises. The system next may identify the person as "unknown" due to the absence of a smartphone, key fob, wearable device, or other device typically used to identify occupants of the premises. Continuing the example, sensor data may be received indicating that a valuable item within the premises has been moved, or that a component of the smart home environment associated with security functions such as a controller disclosed herein, has been moved or damaged. Such sensor data may be received, for example, from a sensor attached to or otherwise associated with the valuable item, from the smart home component itself, or from one or more other sensors within the smart home environment. In response, the system may generate an alert indicating that an unknown person has entered the premises and/or that the item or component has been moved or damaged. The system may further determine that an occupant of the home is close by but not present in the premises, for example based upon a Wi-Fi signal received from the occupant's smartphone, but an absence of near-field or other short-range communication from the same smartphone. In this case, the system may be configured to send the alert to the occupant's smartphone, such as via SMS, email, or other communication. As another example, the system may determine that the premises is already in an "away" state and that no occupants are nearby or expected to return in the near future. In this case, the system may be configured to send the alert to a local law enforcement agency, such as via email, SMS, recorded phone call, or the like.

Data generated by one or more sensors may indicate patterns in the behavior of one or more users and/or an environment state over time, and thus may be used to "learn" such characteristics. For example, sequences of patterns of radiation may be collected by a capture component of a device in a room of a premises and used as a basis to learn object characteristics of a user, pets, furniture, plants, and other objects in the room. These object characteristics may make up a room profile of the room and may be used to make determinations about objects detected in the room.

In another example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 pm, and then declines until another approximate time or time period, such as 5:30 pm, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 pm, an occupant is turning on/off a light as the occupant of the room in which the sensor is located enters/leaves the room. At other times, the light sensor data may indicate that no lights are turned on/off in the room. The system, therefore, may learn occupants' patterns of turning on and off lights, and may generate a response to the learned behavior. For example, at 5:30 pm, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Such learning behavior may be implemented in accordance with the techniques disclosed herein. For example, a smart home environment as disclosed herein may be configured to learn appropriate notices to generate or other actions to take in response to a determination that a notice should be generated, and/or appropriate recipients of a particular notice or type of notice. As a specific example, a smart home environment may determine that after a notice has been sent to a first occupant of the smart home premises indicating that a window in a room has been left open, a second occupant is always detected in the room within a threshold time period, and the window is closed shortly thereafter. After making such a determination, in future occurrences the notice may be sent to the second occupant or to both occupants for the purposes of improving the efficacy of the notice. In an embodiment, such "learned" behaviors may be reviewed, overridden, modified, or the like by a user of the system, such as via a computer-provided interface to a smart home environment as disclosed herein.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 9A:
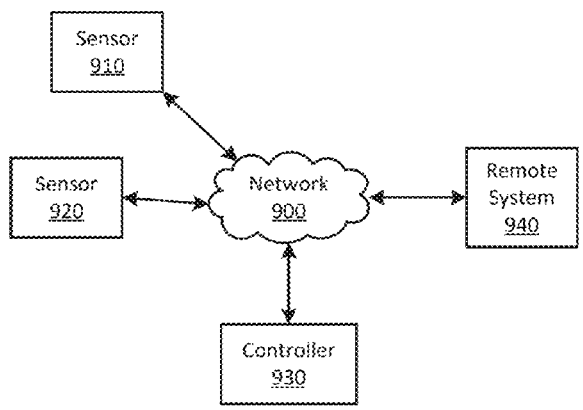
FIG. 9A shows networked sensors according to an implementation the disclosure.

FIG. 9A shows an example of a sensor network as disclosed herein, which may be implemented over any suitable wired and/or wireless communication networks. One or more sensors 910 and 920 may communicate via a local network 900, such as a Wi-Fi or other suitable network, with each other and/or with a controller 930. The controller may be a general- or special-purpose computer. The controller may, for example, receive, aggregate, and/or analyze environmental information received from the sensors 910 and 920. The sensors 910 and 920 and the controller 930 may be located locally to one another, such as within a single dwelling, office space, building, room, or the like, or they may be remote from each other, such as where the controller 930 is implemented in a remote system 940 such as a cloud-based reporting and/or analysis system. Alternatively or in addition, sensors may communicate directly with a remote system 940. The remote system 940 may, for example, aggregate data from multiple locations, provide instruction, software updates, and/or aggregated data to a controller 930 and/or sensors 910, 920.

The devices of the disclosed subject matter may be communicatively connected via the network 900, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in methods and systems of the disclosed subject matter may avoid communication using a single device. That is, in the mesh-type network, such as network 900, there is no single point of communication that may fail so as to prohibit devices coupled to the network from communicating with one another.

The communication and network protocols used by the devices communicatively coupled to the network 900 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 900, may be easy to set up and secure to use. The network 900 may use an authentication scheme, such as AES (Advanced Encryption Standard) encryption or the like, to reduce and/or minimize security holes that exist in other wireless protocols. The Thread network may be scalable to connect devices (e.g., 2, 5, 10, 20, 50, 100, 310, 200, or more devices) into a single network supporting multiple hops (e.g., so as to provide communications between devices when one or more nodes of the network is not operating normally). The network 900, which may be a Thread network, may provide security at the network and application layers. One or more devices communicatively coupled to the network 900 (e.g., controller 930, remote system 940, and the like) may store product install codes to ensure only authorized devices can join the network 900. One or more operations and communications of network 900 may use cryptography, such as public-key cryptography.

The devices communicatively coupled to the network 900 of the smart home environment disclosed herein may have low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 900 may use the power-efficient IEEE 802.15.4 MAC/PHY protocol. In embodiments of the disclosed subject matter, short messaging between devices on the network 900 may conserve bandwidth and power. The routing protocol of the network 900 may reduce network overhead and latency. The communication interfaces of the devices coupled to the smart home environment may include wireless system-on-chips to support the low-power, secure, stable, and/or scalable communications network 900.

The sensor network shown in FIG. 9A may be an example of a smart home environment. The depicted smart home environment may include a structure, a house, office building, garage, mobile home, or the like. The devices of the smart home environment, such as the sensors 910 and 920 the controller 930, and the network 900 may be integrated into a smart home environment that does not include an entire structure, such as an apartment, condominium, or office space.

The smart home environment can control and/or be coupled to devices outside of the structure. For example, one or more of the sensors 910 and 920 may be located outside the structure, for example, at one or more distances from the structure (e.g., sensors 910 and 920 may be disposed outside the structure, at points along a land perimeter on which the structure is located, and the like. One or more of the devices in the smart home environment need not physically be within the structure. For example, the controller 930 which may receive input from the sensors 910 and 920 may be located outside of the structure.

The structure of the smart home environment may include a plurality of rooms, separated at least partly from each other via walls. The walls can include interior walls or exterior walls. Each room can further include a floor and a ceiling. Devices of the smart home environment, such as the sensors 910 and 920, may be mounted on, integrated with and/or supported by a wall, floor, or ceiling of the structure.

The smart home environment including the sensor network shown in FIG. 9A may include a plurality of devices, including intelligent, multi-sensing, network-connected devices, that can integrate seamlessly with each other and/or with a central server or a cloud-computing system (e.g., controller 930 and/or remote system 940) to provide home-security and smart home features. The smart home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 910 and 920 shown in FIG. 9A.

For example, a smart thermostat may detect ambient climate characteristics (e.g., temperature and/or humidity) and may accordingly control an HVAC (heating, ventilating, and air conditioning) system of the structure. For example, the ambient climate characteristics may be detected by sensors 910 and 920 shown in FIG. 9A, and the controller 930 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 910 and 920 shown in FIG. 9A, and the controller 930 may control an alarm system to provide a visual and/or audible alarm to the user of the smart home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 930.

In some embodiments, the smart home environment of the sensor network shown in FIG. 9A may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 910 and 920 shown in FIG. 9A. A smart wall switch may detect ambient lighting conditions, and control a power and/or dim state of one or more lights. For example, a sensor such as sensors 910 and 920, may detect ambient lighting conditions, and a device such as the controller 930 may control the power to one or more lights (not shown) in the smart home environment. Smart wall switches may also control a power state or speed of a fan, such as a ceiling fan. For example, sensors 910 and 920 may detect the power and/or speed of a fan, and the controller 930 may adjust the power and/or speed of the fan, accordingly. Smart wall plugs may control supply of power to one or more wall plugs (e.g., such that power is not supplied to the plug if nobody is detected to be within the smart home environment). For example, one of the smart wall plugs may control supply of power to a lamp (not shown).

In embodiments of the disclosed subject matter, a smart home environment may include one or more intelligent, multi-sensing, network-connected entry detectors (e.g., "smart entry detectors"). Such detectors may be or include one or more of the sensors 910 and 920 shown in FIG. 9A. The illustrated smart entry detectors (e.g., sensors 910 and 920) may be disposed at one or more windows, doors, and other entry points of the smart home environment for detecting when a window, door, or other entry point is opened, broken, breached, and/or compromised. The smart entry detectors may generate a corresponding signal to be provided to the controller 930 and/or the remote system 940 when a window or door is opened, closed, breached, and/or compromised. In some embodiments of the disclosed subject matter, the alarm system, which may be included with controller 930 and/or coupled to the network 900 may not arm unless all smart entry detectors (e.g., sensors 910 and 920) indicate that all doors, windows, entryways, and the like are closed and/or that all smart entry detectors are armed.

The smart home environment of the sensor network shown in FIG. 9A can include one or more intelligent, multi-sensing, network-connected doorknobs (e.g., "smart doorknob"). For example, the sensors 910 and 920 may be coupled to a doorknob of a door (e.g., doorknobs located on external doors of the structure of the smart home environment). However, it should be appreciated that smart doorknobs can be provided on external and/or internal doors of the smart home environment.

The smart thermostats, the smart hazard detectors, the smart doorbells, the smart wall switches, the smart wall plugs, the smart entry detectors, the smart doorknobs, the keypads, and other devices of a smart home environment (e.g., as illustrated as sensors 910 and 920 of FIG. 9A) can be communicatively coupled to each other via the network 900, and to the controller 930 and/or remote system 940 to provide security, safety, and/or comfort for the smart home environment. Alternatively or in addition, each of the devices of the smart home environment may provide data that can be used to determine an occupancy and/or physical status of a premises, as well as data that may be used to determine an appropriate recipient of a notification, as previously disclosed herein.

A user can interact with one or more of the network-connected smart devices (e.g., via the network 900). For example, a user can communicate with one or more of the network-connected smart devices using a computer (e.g., a desktop computer, laptop computer, tablet, or the like) or other portable electronic device (e.g., a smartphone, a tablet, a key FOB, or the like). A webpage or application can be configured to receive communications from the user and control the one or more of the network-connected smart devices based on the communications and/or to present information about the device's operation to the user. For example, the user can view, arm or disarm the security system of the home.

One or more users can control one or more of the network-connected smart devices in the smart home environment using a network-connected computer or portable electronic device. In some examples, some or all of the users (e.g., individuals who live in the home) can register their mobile device and/or key FOBs with the smart home environment (e.g., with the controller 930). Such registration can be made at a central server (e.g., the controller 930 and/or the remote system 940) to authenticate the user and/or the electronic device as being associated with the smart home environment, and to provide permission to the user to use the electronic device to control the network-connected smart devices and systems of the smart home environment. A user can use their registered electronic device to remotely control the network-connected smart devices and systems of the smart home environment, such as when the occupant is at work or on vacation. The user may also use their registered electronic device to control the network-connected smart devices when the user is located inside the smart home environment.

Alternatively, or in addition to registering electronic devices, the smart home environment may make inferences about which individuals live in the home (occupants) and are therefore users and which electronic devices are associated with those individuals. As such, the smart home environment may "learn" who is a user (e.g., an authorized user) and permit the electronic devices associated with those individuals to control the network-connected smart devices of the smart home environment (e.g., devices communicatively coupled to the network 900) in some embodiments, including sensors used by or within the smart home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols. As previously described, such notices may be generated in response to specific determinations of the occupancy and/or physical status of a premises, or they may be sent for other reasons as disclosed herein.

A smart home environment may include communication with devices outside of the smart home environment but within a proximate geographical range of the home. For example, the smart home environment may include an outdoor lighting system (not shown) that communicates information through the communication network 900 or directly to a central server or cloud-computing system (e.g., controller 930 and/or remote system 940) regarding detected movement and/or presence of people, animals, and any other objects and receives back commands for controlling the lighting accordingly.

The controller 930 and/or remote system 940 can control the outdoor lighting system based on information received from the other network-connected smart devices in the smart home environment. For example, in the event that any of the network-connected smart devices, such as smart wall plugs located outdoors, detect movement at nighttime, the controller 930 and/or remote system 940 can activate the outdoor lighting system and/or other lights in the smart home environment.

Figure 9B:
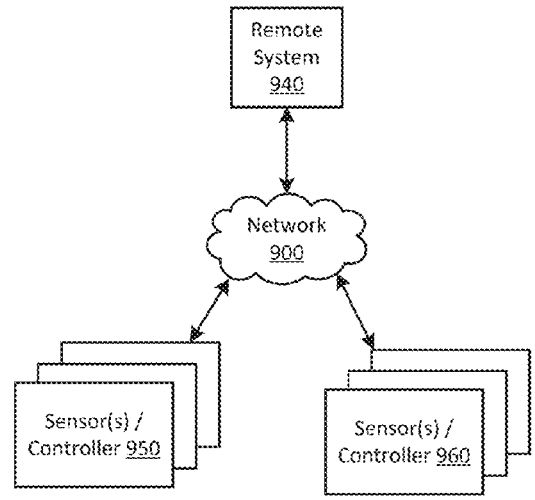
FIG. 9B shows networked sensors according to an implementation the disclosure.

In some configurations, a remote system 940 may aggregate data from multiple locations, such as multiple buildings, multi-resident buildings, individual residences within a neighborhood, multiple neighborhoods, and the like. In general, multiple sensor/controller systems 950 and 960 as shown FIG. 9B may provide information to the remote system 940. The systems 950 and 960 may provide data directly from one or more sensors as previously described, or the data may be aggregated and/or analyzed by local controllers such as the controller 930, which then communicates with the remote system 940. The remote system may aggregate and analyze the data from multiple locations, and may provide aggregate results to each location. For example, the remote system 940 may examine larger regions for common sensor data or trends in sensor data, and provide information on the identified commonality or environmental data trends to each local system 950 and 960. Aggregated data may be used to generate appropriate notices and/or determine appropriate recipients for such notices as disclosed herein. For example, the remote system 940 may determine that the most common user response to a notification that a garage door has been left open while a security component of the smart home environment is in an armed state, is that the user returns to the premises and closes the garage door. Individual smart home systems and/or controllers as previously disclosed may receive such data from the remote system and, in response, set a default action of closing the garage door when the system determines that an armed state has been set and the garage door has been left open for more than a minimum threshold of time. The data provided to the individual systems may be only aggregate data, i.e., such that no individual information about any one other smart home environment or type of smart home environment is provided to any other. As another example, the remote system may receive data from multiple premises in a particular geographic region, indicating that it is raining in the region, and that the rain is moving east (based on the times at which the data indicating rainfall is received from different premises). In response, the remote system may provide an indication to premises further to the east that rain may be expected. In response, notifications may be provided to occupants of the individual premises that rain is expected, that particular windows should be closed, or the like. In some configurations users may be provided with the option of receiving such aggregated data, and/or with the option of providing anonymous data to a remote system for use in such aggregation. In some configurations, aggregated data also may be provided as "historical" data as previously disclosed. Such data may be used by a remote system and/or by individual smart home environments to identify trends, predict physical statuses of a premises, and the like.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Figure 10:
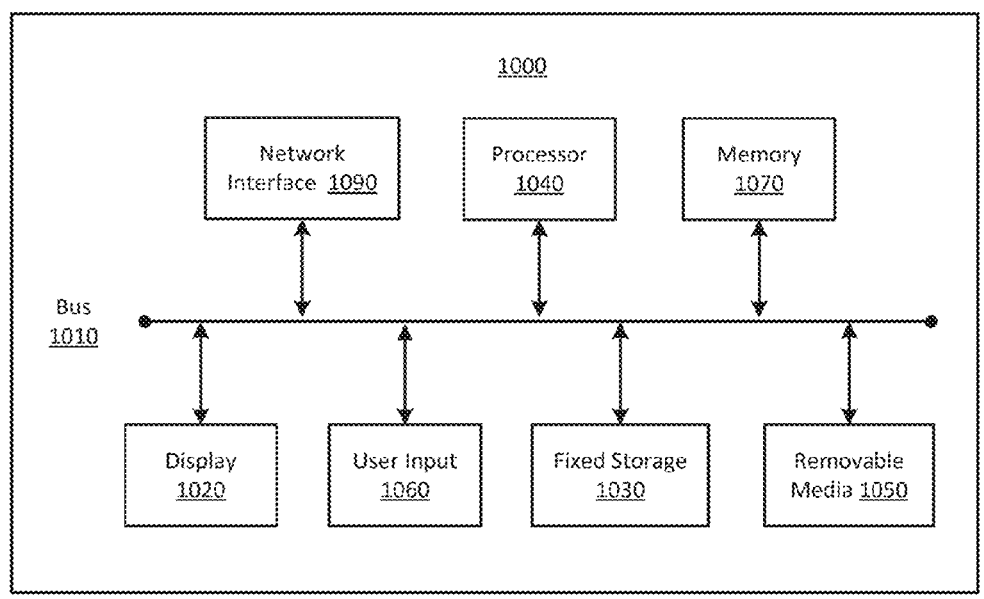
FIG. 10 shows a computing device according to an implementation the disclosure.

Embodiments of the presently disclosed subject matter may be implemented in and used with a variety of computing devices. FIG. 10 is an example of a computing device 1000 suitable for implementing embodiments of the disclosed subject matter. For example, the device 1000 may be used to implement a controller, a device including sensors as disclosed herein, or the like. Alternatively or in addition, the device 1000 may be, for example, a desktop or laptop computer, or a mobile computing device such as a smart phone, tablet, or the like. The device 1000 may include a bus 1010 which interconnects major components of the computer 1000, such as a central processor 1040, a memory 1070 such as Random Access Memory (RAM), Read Only Memory (ROM), flash RAM, or the like, a user display 1020 such as a display screen, a user input interface 1060, which may include one or more controllers and associated user input devices such as a keyboard, mouse, touch screen, and the like, a fixed storage 1030 such as a hard drive, flash storage, and the like, a removable media component 1050 operative to control and receive an optical disk, flash drive, and the like, and a network interface 1090 operable to communicate with one or more remote devices via a suitable network connection.

The bus 1010 allows data communication between the central processor 1040 and one or more memory components 1030 and 1070, which may include RAM, ROM, and other memory, as previously noted. Applications resident with the computer 1000 are generally stored on and accessed via a computer readable storage medium.

The fixed storage 1030 may be integral with the computer 1000 or may be separate and accessed through other interfaces. The network interface 1090 may provide a direct connection to a remote server via a wired or wireless connection. The network interface 1090 may provide such connection using any suitable technique and protocol as will be readily understood by one of skill in the art, including digital cellular telephone, Wi-Fi, Bluetooth®, near-field, and the like. For example, the network interface 1090 may allow the device to communicate with other computers via one or more local, wide-area, or other communication networks, as described in further detail herein.

Figure 11:
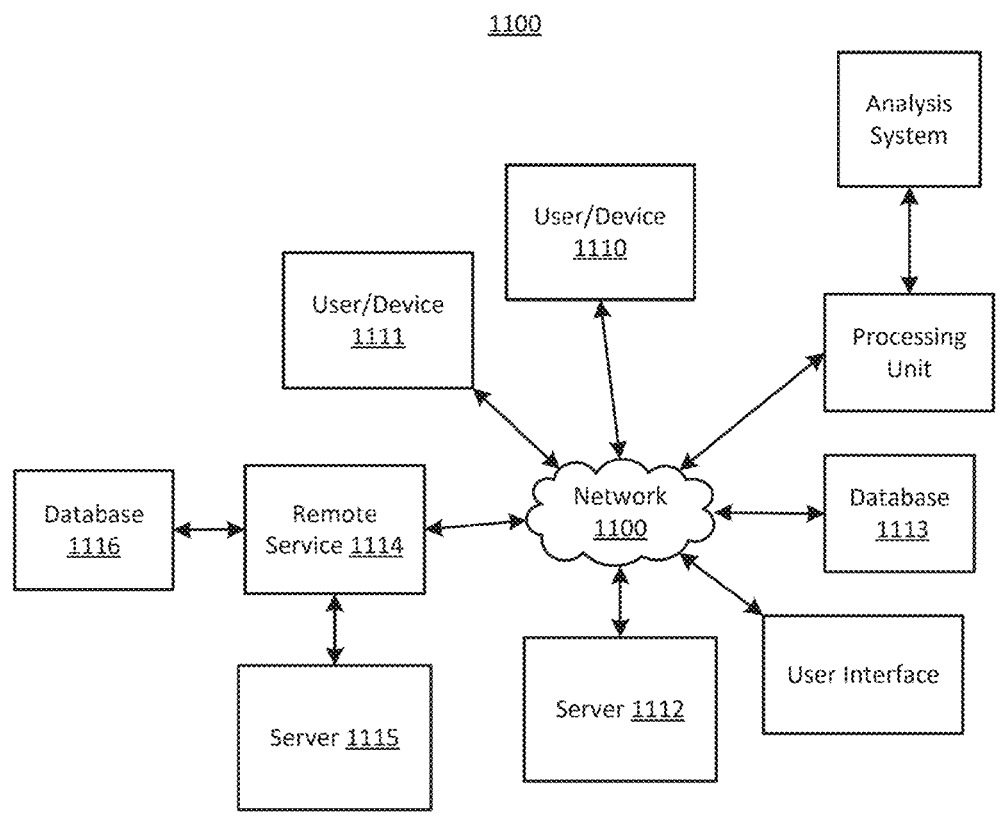
FIG. 11 shows a networked arrangement according to an implementation the disclosure.

FIG. 11 shows an example network arrangement according to an embodiment of the disclosed subject matter. One or more devices 1110 and 1111, such as local computers, smart phones, tablet computing devices, and the like may connect to other devices via one or more networks 1100. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 1112 and/or databases 1113. The remote devices may be directly accessible by the devices 1110 and 1111, or one or more other devices may provide intermediary access such as where a server 1112 provides access to resources stored in a database 1113. The devices 1110 and 1111 also may access remote platforms 1114 or services provided by remote platforms 1114 such as cloud computing arrangements and services. The remote platform 1114 may include one or more servers 1115 and/or databases 1116.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   receiving a signal from a sensor indicating that a device is not mounted properly;
   emitting radiation from an emission component arranged in a single housing of the device in response to the signal;
   capturing infrared radiation at a capture component arranged in the single housing of the device;
   comparing a characteristic of the captured infrared radiation to a test characteristic; and
   determining the capture component is not operating properly when the characteristic of the captured infrared radiation differs from the test characteristic by greater than a threshold quantity.

2. The method of claim 1, wherein the emitted radiation comprises infrared radiation having energy that is greater than energy of infrared radiation emitted from a background source.

3. The method of claim 1, wherein the emitted radiation comprises infrared radiation having energy that is less than energy of infrared radiation emitted from an average human at a distance of approximately 6 meters from the capture component.

4. The method of claim 1, wherein the emitted radiation comprises radiation having a wavelength of approximately 8-14 microns.

5. The method of claim 1, wherein the captured infrared radiation comprises at least a portion of the emitted radiation.

6. The method of claim 1, wherein:
   the test characteristic comprises a test voltage generated at the capture component when radiation having energy substantially equal to energy of the emitted radiation is emitted from the emission component and captured at the capture component,
   the characteristic of the captured infrared radiation comprises a voltage generated at the capture component when the captured infrared radiation is captured at the capture component, and
   comparing comprises determining a difference between the test voltage and the voltage generated at the capture component when the captured infrared radiation is captured.

7. The method of claim 1, further comprising, in response to determining the capture component is not operating properly, providing to a component of a home automation system, a status of the device that indicates the device is not operating properly.

8. The method of claim 1, further comprising:
prior to emitting the radiation, detecting an event by a sensor that is remote from the device and that is in communication with the device; and
providing a request to the device to determine a status of the device,
wherein emitting the radiation is in response to receiving the request at the device.

9. The method of claim 1, further comprising:
prior to emitting the radiation, detecting an event by a sensor that is remote from the device and that is in communication with the device;
determining a period of time has elapsed after detecting the event;
determining an event has not been detected by the device within the period of time; and
providing a request to the device to determine a status of the device,
wherein emitting the radiation is in response to receiving the request at the device.

10. A system comprising:
a device comprising a radiation emission component arranged in a single housing of the device and a radiation capture component arranged in the single housing of the device; and
a processor in communication with the device and configured to execute instructions comprising:
receiving a signal from a sensor indicating that the device is not mounted properly;
emitting radiation from the emission component in response to the signal;
capturing infrared radiation at the capture component;
comparing a characteristic of the captured infrared radiation to a test characteristic;
determining the capture component is not operating properly when the characteristic of the captured infrared radiation differs from the test characteristic by greater than a threshold quantity; and
determining a status of the device based on determining the capture component is not operating properly.

11. The system of claim 10, wherein the emission component comprises a light emitting diode.

12. The system of claim 10, wherein the capture component comprises a pyroelectric material.

13. A system of claim 10, wherein the emission component is disposed on the device substantially adjacent to the capture component.

14. The system of claim 10, wherein the device further comprises an attachment sensor that detects when the device is not properly mounted.

15. The system of claim 10, wherein the device further comprises an attachment sensor that detects when the device is not properly mounted, and the attachment sensor comprises at least one selected from the group consisting of:
a mechanical switch that provides an electrical signal when the mechanical tamper switch has been triggered;
an electrical switch comprising a first electrode housed in an attachment component of the device and a second electrode disposed on a surface to which the device is mounted;
an accelerometer;
a magnetic switch; and
a light sensor.

16. The system of claim 10, wherein the instructions further comprise:
prior to emitting the radiation, detecting an event by a sensor that is remote from the device and that is in communication with the processor; and
providing a request to the device to determine a status of the device,
wherein emitting the radiation is in response to receiving the request at the device.

17. The system of claim 10, wherein the instructions further comprise:
prior to emitting the radiation, detecting an event by a sensor that is remote from the device and that is in communication with the processor;
determining a period of time has elapsed after detecting the event;
determining an event has not been detected by the device within the period of time; and
providing a request to the device to determine a status of the device,
wherein emitting the radiation is in response to receiving the request at the device.

18. A non-transitory computer readable medium storing instructions comprising:
detecting a device is not properly mounted;
in response to detecting the device is not properly mounted, emitting radiation from an emission component arranged in a single housing of the device;
capturing infrared radiation at a capture component arranged in the single housing of the device;
comparing a characteristic of the captured infrared radiation to a test characteristic; and
determining the capture component is not operating properly when the characteristic of the captured infrared radiation differs from the test characteristic by greater than a threshold quantity.

19. The non-transitory computer readable medium of claim 18, wherein detecting the device is not properly mounted comprises at least one selected from the group consisting of:
determining a signal associated with proper mounting of the device is no longer present,
determining a signal associated with improper mounting of the device is present,
determining an accelerometer sensor value exceeds a threshold value, and
determining a light sensor value exceeds a threshold value.

20. The non-transitory computer readable medium of claim 18, wherein:
the test characteristic comprises a test sequence of voltage peaks generated at the capture component when radiation having energy substantially equal to energy of the emitted radiation is emitted from the emission component and captured at the capture component,
the characteristic of the captured infrared radiation comprises a sequence of voltage peaks generated at the capture component when the captured infrared radiation is captured at the capture component, and
comparing comprises determining a difference between the test sequence of voltage peaks and the sequence of voltage peaks generated at the capture component when the captured infrared radiation is captured.

* * * * *